US005590591A

United States Patent [19]

Kim

[11] Patent Number: 5,590,591
[45] Date of Patent: Jan. 7, 1997

[54] PRODUCT PROCESSING APPARATUS INCLUDING ORIENTATION AND CORING OF PRODUCE ITEMS

[76] Inventor: Sun Y. Kim, 2384 Lancaster Ct., Hayward, Calif. 94543

[21] Appl. No.: 634,245

[22] Filed: Apr. 18, 1996

[51] Int. Cl.[6] .................... A23L 1/00; A23N 4/12; A23N 4/22; A23N 15/02
[52] U.S. Cl. .................... 99/544; 99/549; 99/564; 99/635; 99/637; 99/643; 99/472
[58] Field of Search .............. 99/542–544, 545, 99/546, 549, 550, 557, 564, 591–594, 491, 472, 635–643; 426/482–484, 485

[56] References Cited

U.S. PATENT DOCUMENTS

| | | | |
|---|---|---|---|
| 3,869,977 | 3/1975 | Minera | 99/640 |
| 3,952,646 | 4/1976 | Leban | 99/639 |
| 4,112,838 | 9/1978 | Altman et al. | 99/546 |
| 4,138,940 | 2/1979 | Fujii | 99/636 |
| 4,331,691 | 5/1982 | Poovaiah et al. | 426/302 |
| 4,771,682 | 9/1988 | Ishikawa | 99/593 |
| 4,998,468 | 3/1991 | Nagaoka | 99/636 |
| 5,000,087 | 3/1991 | Nagaoka | 99/491 X |
| 5,181,459 | 1/1993 | Camezon et al. | 99/546 |
| 5,410,955 | 5/1995 | Paterson et al. | 99/636 X |
| 5,431,095 | 7/1995 | Paterson et al. | 99/546 X |
| 5,435,238 | 7/1995 | Paterson et al. | 99/564 |
| 5,447,737 | 9/1995 | Blandine et al. | 426/484 |

*Primary Examiner*—Timothy F. Simone
*Attorney, Agent, or Firm*—Bielen, Peterson & Lampe

[57] ABSTRACT

A food processing apparatus particularly designed for handling produce items with a calyx and including a vacuum mechanism for grasping the produce item by the calyx for orientation and transportation of the item and a coring implement for removal of the calyx from a properly oriented produce item, the processing apparatus being designed to perform grasping and coring operations at separate stations or is a single operation.

18 Claims, 5 Drawing Sheets

PRODUCT PROCESSING APPARATUS INCLUDING ORIENTATION AND CORING OF PRODUCE ITEMS

BACKGROUND OF THE INVENTION

This invention relates to coring apparatus, and in particular to a novel orientation mechanism and coring tool for soft fruit and the like, particularly having a calyx, such as the strawberry.

In the field of food processing, preparation of fruit and vegetables for freezing, canning or specialty preparations frequently requires removal of the core and additional matter at the stem. While machine coring of apples and other relatively large and rugged produce have been advanced for automatic processing, certain delicate fruit, typified by the strawberry, have provided food machinery developers with vexing problems.

Two of the primary problems are orienting the variously shaped strawberries for the coring step and the design of a coring tool for the delicate skin and meat of the fruit. In the case of the strawberry, coring must extract any attached calyx along with a shallow core. In using the term core, the term is applied to the extraction of the discardable matter without necessarily passing through the top and bottom of the produce.

SUMMARY OF THE INVENTION

The coring apparatus of this invention has been devised to automatically process delicate to handle fresh produce. Certain types of produce, such as strawberries are difficult to process because of the delicate structure of the fruit and the variation in size and shape. Additionally, the strawberry has a difficult calyx that must be removed with the stem, if any. Attached to the stem and calyx is a discardable portion of internal fruit fibre that is inconsistent with the remaining juicy portion desired for frozen strawberries, jams, purees and other products. This shallow pulpy core attached to the stem and calyx is extracted without damage to the remaining berry.

The coring apparatus of this invention includes a novel vacuum mechanism to seize the strawberry by the calyx and position the fruit for automatic coring by a novel coring tool. The coring tool is specially designed to extract the difficult to remove calyx.

The coring apparatus described is primarily designed for processing strawberries, but it is contemplated that other similarly configured produce, such as cherry tomatoes may be processed using all or part of the coring apparatus defined. The stage in the food processing operation that is of primary concern in this invention is the stage of selection and coring of the produce, after preparation by washing and conveyance to the coring apparatus. It is preferred that the selection and coring steps be accomplished in an integrated apparatus, however, it is contemplated that the steps may be selectively performed on certain produce using one or the other of the key selection and coring components in the apparatus described. Additionally, while the detailed description of the preferred embodiments shows the coring apparatus primarily as a three-step sequential procedure, it is to be understood that the steps can be combined into a multi-action mechanism as schematically shown and described with reference to an alternate embodiment.

The preferred coring apparatus includes selection and orientation components that directly remove individual strawberries from queues in a berry bath by vacuum grasping the calyx of the fruit and individually depositing the fruit in a separate, cup-like, wire basket on a continuous conveyer. The conveyer step conveys each basket in a continuous string of baskets to a coring station where a coring tool performs the coring operation of extracting the calyx. The cored fruit is dumped from the baskets into a receiver, for further processing for the product desired.

Other features including a guide sleeve to guide the positioning of the strawberry in the grasping procedure, and spring control to position and steady the fruit in the contoured basket at the coring station are described for optimized results. Additionally, rows of cups on a stepped conveyer operating with multiple coring components at a coring station allows a greater quantity of fruit to be processed. These and other features of this invention are described in greater detail in the following sections of the specification.

DETAILED DESCRIPTION OF THE PREFERRED EMBODIMENTS

Figure 1:
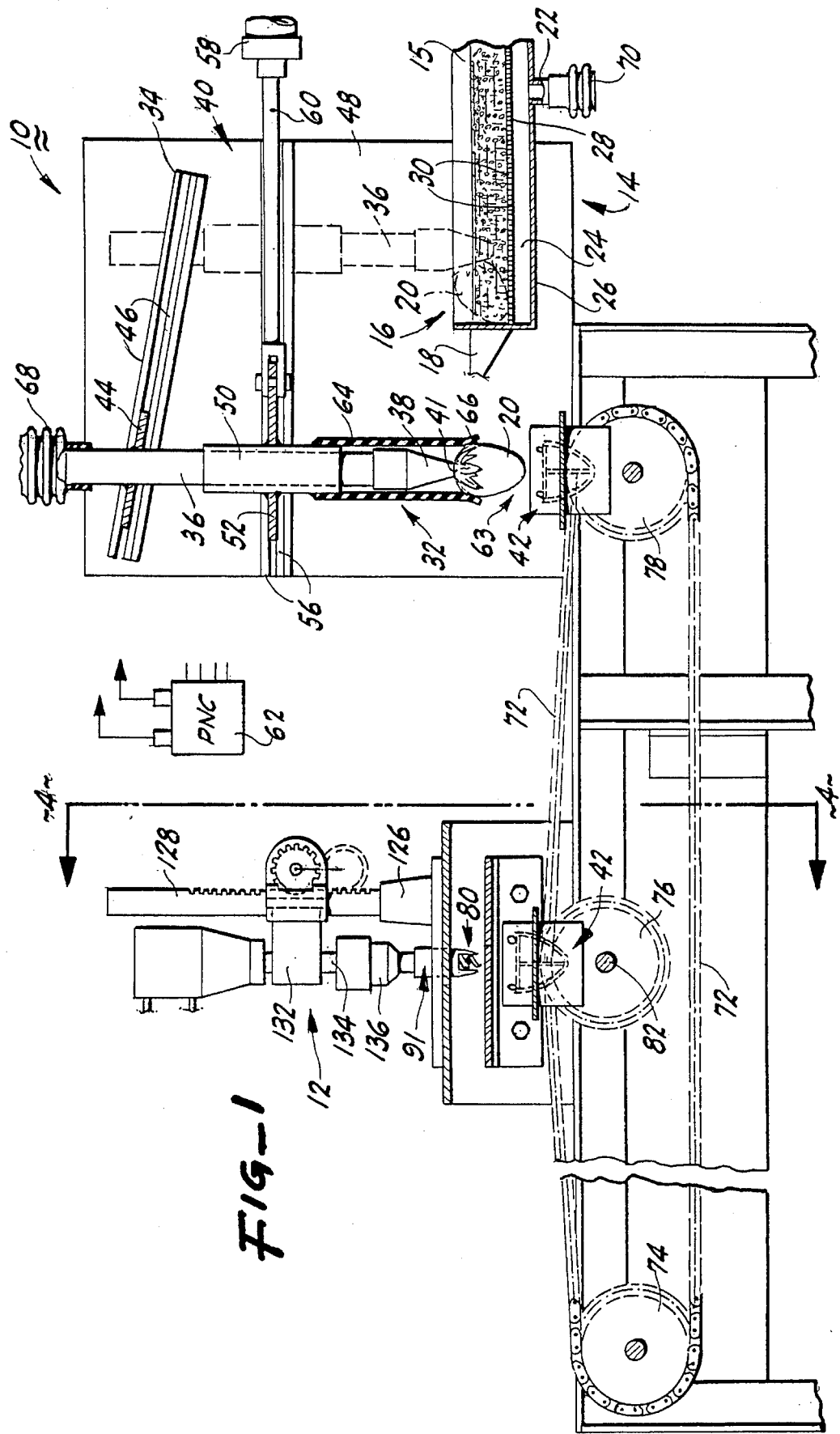
FIG. 1 is a side elevational view of the produce processing apparatus including the pick-up station and coring station.

Referring to the side elevational view of FIG. 1, the coring apparatus, designated generally by the reference numeral 10, is shown with coring component 12 and a selective feed component 14. The selective feed component 14 has a tray 15 that preferably holds water for floating fruit to minimize bruising, and is fed by any conventional fruit supply means such as a conveyer mechanism (not shown). The feed component 14 floats fruit to a pick-up station 16 at the end 18 of the tray 15.

At the dead end pickup station 16, the end fruit item 20, here a strawberry in a strawberry preparation process, is positioned for pickup. Because the strawberry is picked up by its calyx, techniques such a percolating microbubbles are employed to assist in orienting the strawberry with calyx upward or sidewards. The microbubbles attach to the calyx for localized buoyancy. The microbubbles are generated by pressurized air delivered through an air line 22 connected to an air chamber 24 formed by a manifold 26 under a bottom portion 28 of the feed tray 12. The bottom portion of the feed tray 12 is perforated with small holes (not visible). The holes 30 in the bottom portion 28 of the feed tray 12 are small enough to prevent water from seeping into the manifold when depressurized. Other means may be used to optimize positioning of fruit in a feed tray, for example using vibratory feeders that assist in orienting the fruit in V-shaped cues for pick up.

The selective feed component 14 has a vacuum mechanism 31 for plucking the fruit item 20 from the end 18 of the tray 15. The vacuum unit 32 includes a cam mechanism 34 to position a vacuum conduit 36 over the end 18 of the tray 15 for orienting a vacuum orifice 38 at the end of the conduit 36 beside the end fruit item 20 to be removed from the tray 15. The vacuum orifice has a flat taper from the cylindrical configuration of the conduit 36 to an end slot 39. The end slot 39 is protected by teeth 41 which inwardly curve to engage the calyx and prevent premature release.

Figure 2:
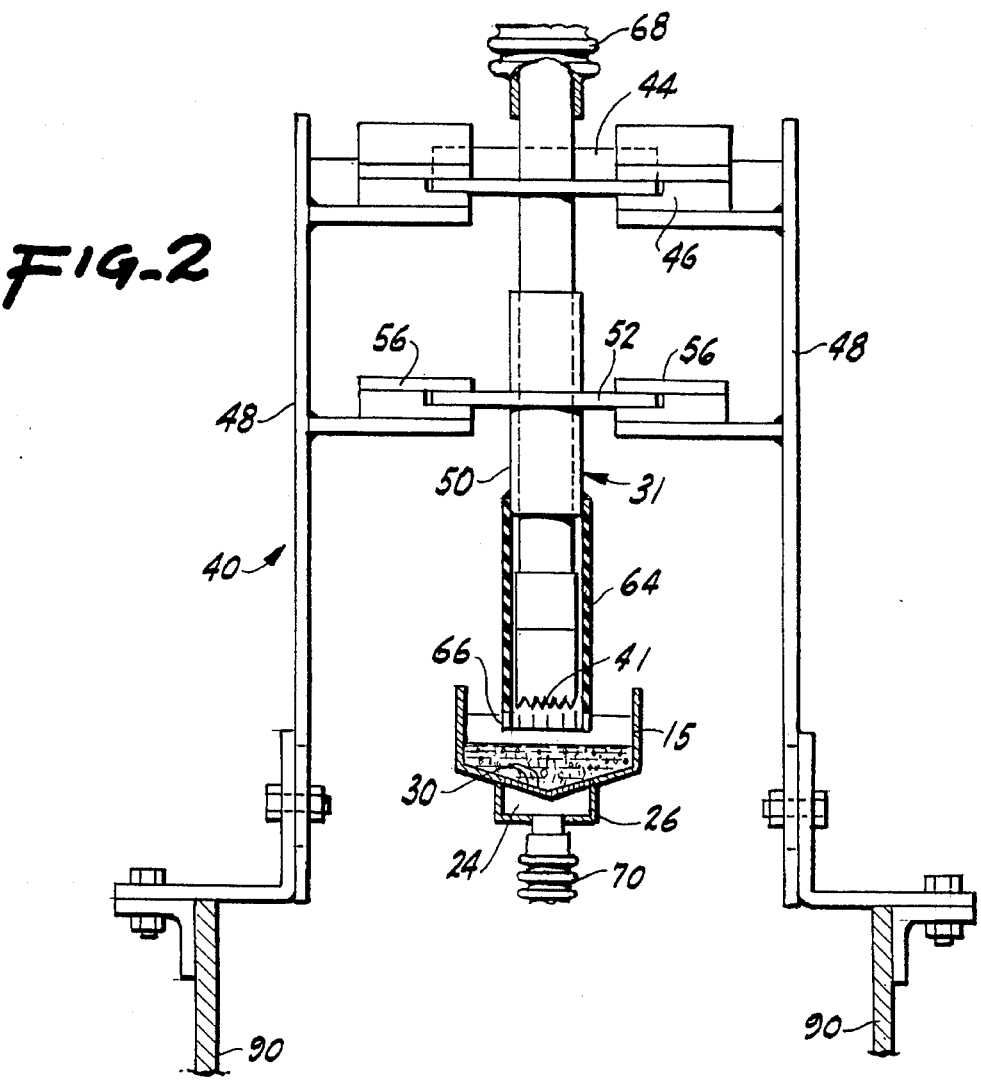
FIG. 2 is an end elevational view of the pick-up station of FIG. 1.

As shown in broken line in FIG. 1, the vacuum conduit 36 is connected to a slide mechanism 40 that maintains the vertical orientation of the vacuum conduit 36 as it moves from a position at the end 18 of the tray 15 to a position over a conveyed receptacle 42 on the coring component 12. The vacuum conduit 36 is joined to an angled cam plate 44 that slides between two outer support plates 48 as shown in FIG. 2, on rib-like guides 46 on the plates 48. The conduit 36 is also slidably engaged in a guide tube 50 that in turn is joined to a horizontal cam plate 52 that slides between the support plates 48 on rib-like guides 56. A pneumatic actuator 58 has a piston 60 connected to the horizontal cam plate 52 for reciprocal displacement of the vacuum conduit 36 from the position shown in broken line over the tray 15 position shown in solid line over the receptacle 42. Notably, as the vacuum conduit 36 displaces the elevation of the vacuum orifice changes by action of the angled cam plate 44.

In operation, under control of a microprocessing unit 60, a pneumatic control system 62 generates a vacuum in the vacuum conduit 36 so that a high velocity airstream is generated in the specially designed opening slot 39 in the vacuum orifice 38. When the vacuum orifice 38 is positioned at the end 18 of the tray 15, a portion of the calyx of the fruit item 20 is drawn into the orifice, which is configured to block the remaining fruit item, allowing the vacuum conduit 36 to be raised with the fruit item 20 suspended while the vacuum conduit 36 is displaced to the release station 63, here the position over the receptacle 42 as shown in FIG. 1. Preferably, a cylindrical shroud 64 attached to the guide tube 50 assists in orienting the fruit item with the calyx at the top. The shroud 64 can be a plastic tube with a slotted end to provide a perimeter of flexible fingers 66 to accommodate oversized fruit items. When positioned over the receptacle, the microprocessing unit signals the pneumatic control system 62 to break the vacuum, for example, by switching open valve 67, to a closed position and release the fruit item 20 which drops into the receptacle 42.

It is to be understood that by use of cam pins instead of the angled cam plate 44, the vertical path of travel of the vacuum conduit 36, and hence the orifice 38 and transported fruit item, can be configured to the set-up between the feed component 14 and the coring component 12. By use of flexible hoses 68 and 70 to connect to the pneumatic control system 62, the arrangement between the feed component 14 and the coring component 12 can be designed for variations in the system and in the type of items being processed.

The receptacle 42 on the coring component 12 is one of a series of receptacles that are suspended between a pair of spaced conveyer chains 72 carried on three set of chain sprockets, 74, 76 and 78. As shown in the cross sectional view of FIG. 2, the central sprockets 76 at a coring station 80 is mounted on a drive shaft 82 that includes a gear 84 that meshes with the output drive gear 86 of a precision stepping motor 88 mounted to one of the side panels 90. The stepping motor 88 is electrically connected to the microprocessing unit 62 to stop a receptacle 42 at the coring station 80 in line with a coring implement 91. While stopped, and concurrent with the coring procedure, a receptacle 42 is being filled with a fruit item by the feed component 14.

Figures 3, 5:
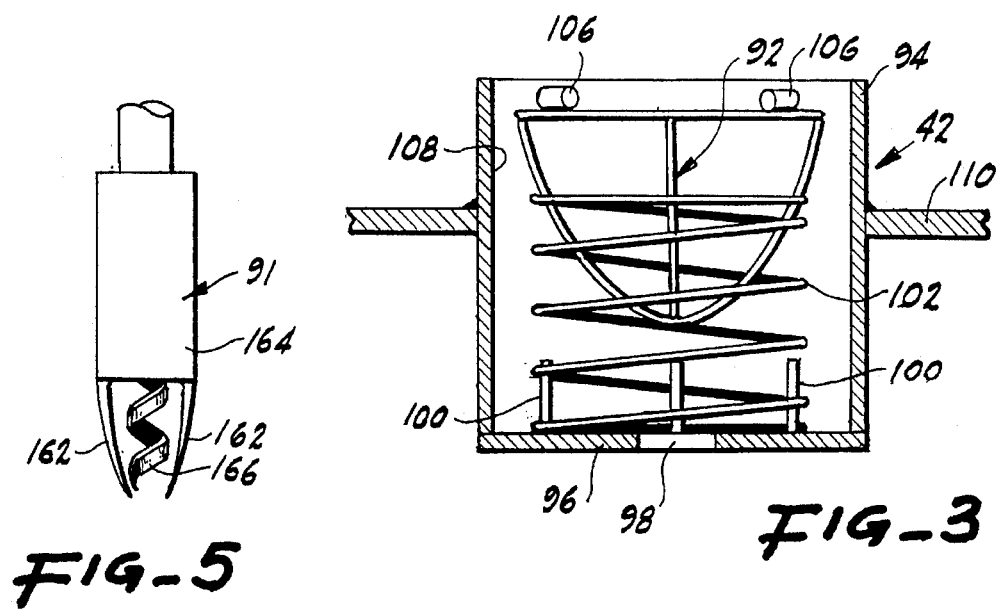
FIG. 3 is an enlarged elevational view of a typical produce item receptacle shown in FIG. 1.
FIG. 5 is an enlarged cross sectional view of the coring implement taken on the lines 5—5 in FIG. 1.

For delicate fruit such as the strawberry, the receptacle 42 has a specially-designed, wire frame basket 92 as shown in the detailed, cross-sectional view of FIG. 3. The receptacle 42 has an outer cylindrical cup 94 with a bottom 96 having a hole 98 for drainage. On the inside of the bottom 96 are mounted locator pins 100 for seating an easily compressible compression spring 102. The compression spring 102 supports the parabolically shaped wire basket 92, which is retained by pins 106 mounted to the inside of the wall 108 of the cup 44. The configuration of the basket 92 is designed to receive a strawberry deposited by the vacuum conduit and retain the orientation of the berry with calyx uppermost. In this manner, the coring implement 91 will engage the calyx and core the top of the fruit item with minimal damage to the remainder of the fruit. The compression spring 102 prevents excessive force form being applied to the berry during the coring procedure, which may otherwise squash and damage the fragile berry.

The receptacle 42 is connected to the conveyer chains 72 by a collet 110 around the cylindrical cup with extensions 112 having clamps 114 that connect the receptacle 42 to the chains 72. The receptacles 42 can be easily replaced or adjusted in position according to the specific use of the coring apparatus 10.

At the coring station 80 is located a coring mechanism 116 mounted on a raised platform 118 having a top plate 120 with side plates 122 mounted on brackets 124 connected to the side panels 90 of the coring component 12. The coring mechanism 116 includes a drill support 126 with parallel guide rods 128 supporting a vertically displaceable carriage 130. The carriage 130 retains a journal 132 with a rotatable shaft 134 connected to a chuck 136 in which is carried the removable coring implement 91. A variable speed drive motor 138 is connected to the shaft 134 to rotate the shaft and the coring implement 91. Mounted on the carriage 130 is a small stepping motor 140 having a dual drive shaft 142 with pinions 144 that are positioned at apertures 146 in sleeves 148 of the carriage to engage racks 150 on the rods 128 of the drill support 126. The carriage 130 enables the rotatable shaft 134 and coring implement 91 to be raised and lowered along the axis of the shaft 34.

An electronic control module 152 electronically controls the speed of the rotation of the coring implement 91 and the timing and rate of raising and lowering of the carriage 130 to perform the coring operation on an item temporarily positioned below the coring mechanism 116.

To separate the berry 20 from the coring implement 91, an adjustable shield 156 is connected to the side plates 122 by wing-nuts 158. The vertical adjustment allows the device to accommodate different berries or fruit that may be processed. The shield 156 has a hole 160 slightly larger in diameter than the coring implement 91 allowing the coring implement to engaged core the berry on lowering and retract, leaving the berry behind, blocked by the shield 156. Various means may be used to remove the calyx from the coring implement such as high speed reverse rotation or a high velocity jet of air or water, while awaiting the positioning of the next berry.

Figure 4:
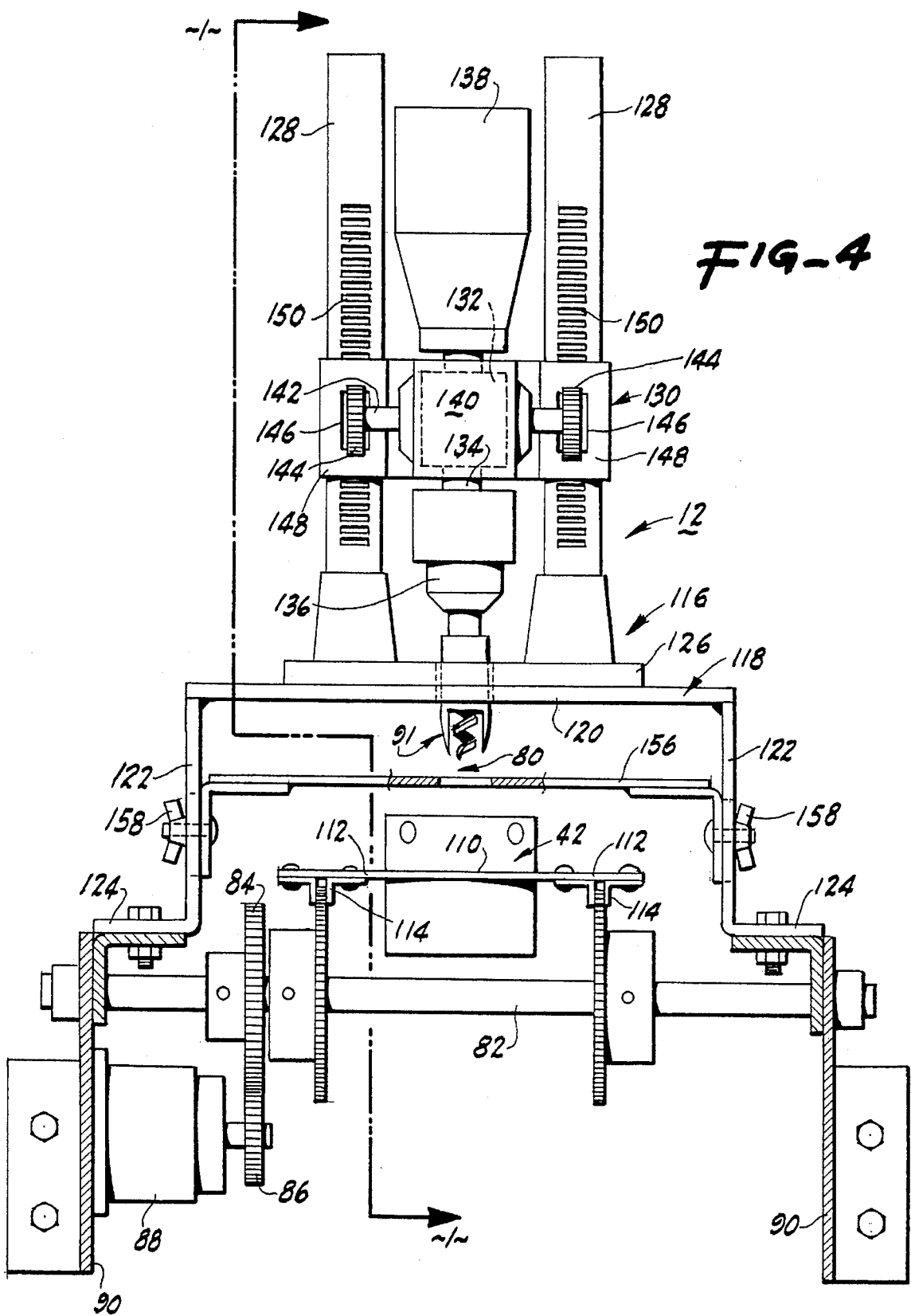
FIG. 4 is an end elevational view of the coring station of FIG. 1.

In the enlarged cross-sectional view of FIG. 5, the coring implement 91 is shown oriented 90° from its orientation in FIG. 4. The coring implement has a pair of outer, knife-like, reamer blades 162 (one shown in FIG. 5) that preferably have a slight curvature conforming to the cylindrical implement base 164 for simplicity in fabrication. The opposed reamer blades cut a circular core as a central, helical ribbon blade 166, essentially a corkscrew device, engages the calyx and penetrates the portion of the berry being reamed. The ribbon blade entangles the calyx and engages the core of pulpy material at the calyx for removal. In general, for most applications, the end of the helical ribbon blade 166 and the ends of the reamer blades 162 terminate at the same plane.

Notably, because the vacuum conduit 36 has an internal diameter larger than the external diameter of the coring implement 91, by slight redesign of the flattened vacuum orifice 38 to provide for passage of the rotating reamer blades, the coring implement can be installed within the conduit by a telescoping design for one-step pickup and coring of the berry.

Figure 6:
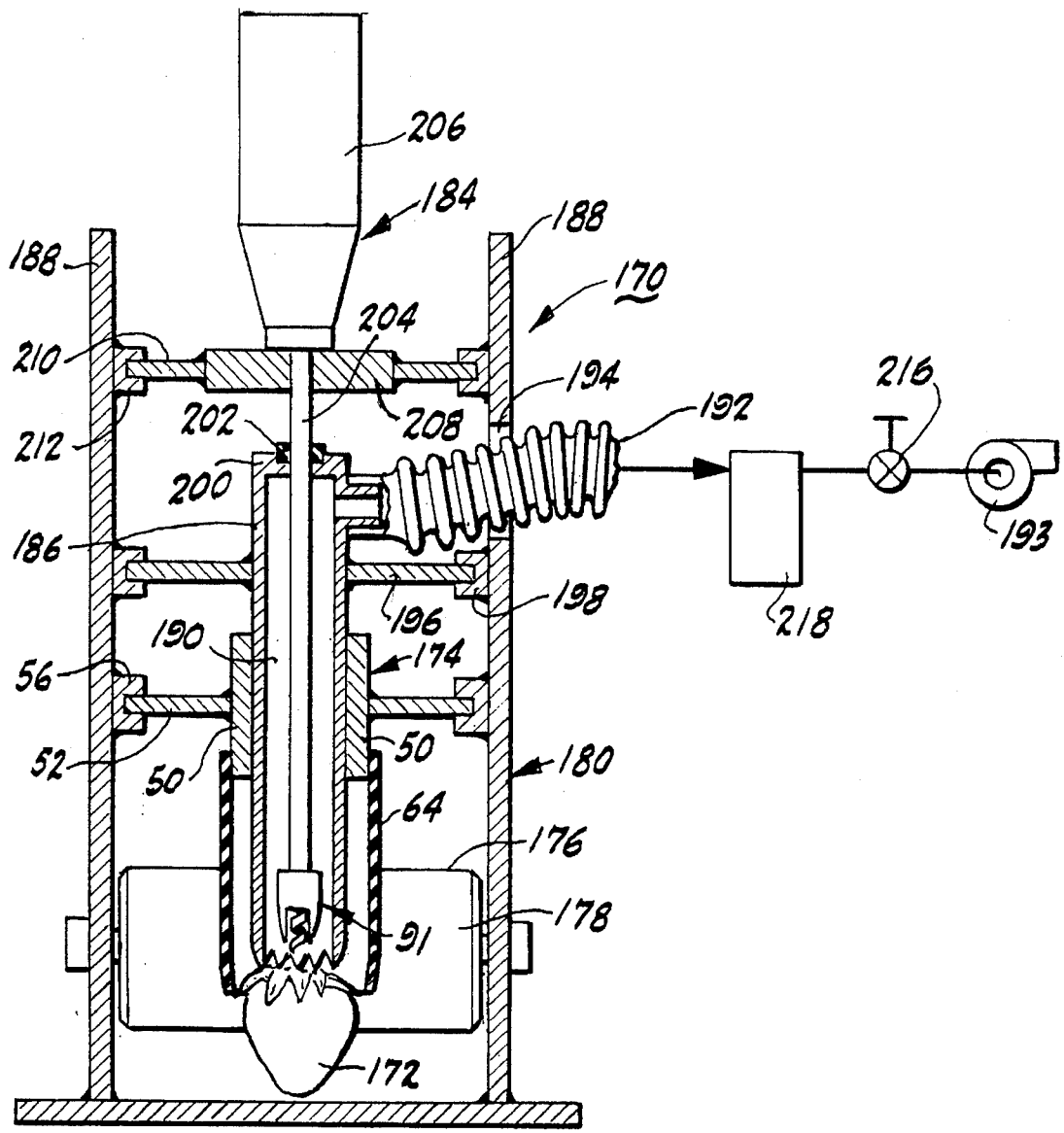
FIG. 6. is an end elevational view, partially in cross section of an alternate embodiment of the processing apparatus.

Referring to the schematic illustration of FIG. 6, the pickup operation of FIG. 2 and the coring operation of FIG. 4 are combined in a process apparatus 170 to enable coring to be performed while the produce item is being held by the vacuum mechanism. A spring-like support, such as the spring supported basket 92 of FIG. 3 is preferred for the coring operation to prevent the produce item 172 from being dislodged from the vacuum orifice by the coring implement 91 during coring. Alternately, for the combined process apparatus 170 of FIG. 6, the produce item 172 is conveyed by a pickup and coring mechanism 174 to a net-like web 176 of a web conveyer 178 operating at the same linear speed as the displacement speed of the coring mechanism during the coring operation. The produce item 172 is lightly pressed against the flexible web 176 before the produce item is released and conveyed by the web conveyer 178 to the next processing station.

For greatest design flexibility a slide mechanism 180, similar to the slide mechanism 40 of FIG. 2, provides for separate vertical displacement of the coring component 184 and the vacuum component 186 relative to the guide tube 50. The guide tube 50 is joined to a flat cam plate 52 that slides on rib-like guides 56, on spaced support plates 188 as in FIG. 2, to maintain the vertical stability of the remaining components. The vacuum component 186 has a modified vacuum conduit 190 with a side access vacuum hose 192 that is connected to a vacuum source 193 through a port 194 in one of the support plates 188. The hose 195 is flexible allowing the vacuum conduit 190 a degree of vertical movement to allow a produce item 172 picked up from a feed component of the type shown in FIG. 1 to be raised and deposited on the web 176. The vacuum conduit 190 has a pair of cam rods 196 slidable in curvilinear, rib-like guides 198 to provide the vertical displacements of the vacuum conduit during horizontal displacement of the connected cam plate 52 by an actuator (not visible) of the type shown in FIG. 1.

The top 200 of the vacuum conduit 190 has a seal 202 through which a coring shaft 204 is displaceable and rotatable. The coring shaft 204 is connected to a variable-speed, drive motor 206 mounted on a carriage 208 having cam rods 210 that slide in curvilinear, rib-like guides 212 to raise and lower the coring component 184 and the coring implement 91 at the end of the shaft 202.

Although in select environments the carriage 208 could be connected to a cam plate with no vertical displacement allowing the displaceable vacuum conduit to raise the produce item 172 into the coring implement, the ability to raise and lower the coring component 184 provides for greater flexibility in tailoring the apparatus to auxiliary up-line and down-line components.

Figure 7:
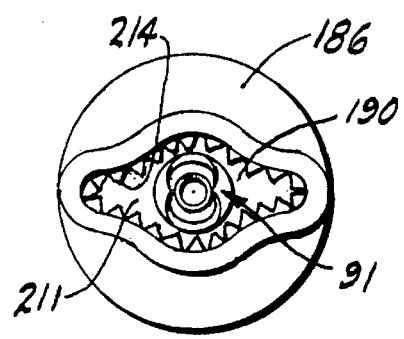
FIG. 7 is a bottom view of the vacuum orifice and coring implement of FIG. 6.

As shown, the shaft 202 and coring implement 91 are concentric to the vacuum conduit 190 and as shown in the enlarged view of FIG. 7, the flattened vacuum orifice 210 has an opening 212 protected by teeth 214 configured to permit the coring implement 91 to protrude a short distance through the opening 212 during the coring operation. The location of the coring implement in the vacuum conduit 190 behind the vacuum orifice opening 212 functions like the teeth 212 to generate localized high velocity air intake to ensnare the calyx. As noted, after coring, the coring implement is withdrawn, the vacuum is cut by electro valve 216 and the produce item is released. During the return to pickup, the vacuum is resumed and the coring implement is operated at high speed to dislodge the calyx and attached pulp in the vacuum conduit 190. The dislodged matter is drawn to a sealed disposal container 218 where it is periodically removed.

Figure 8:
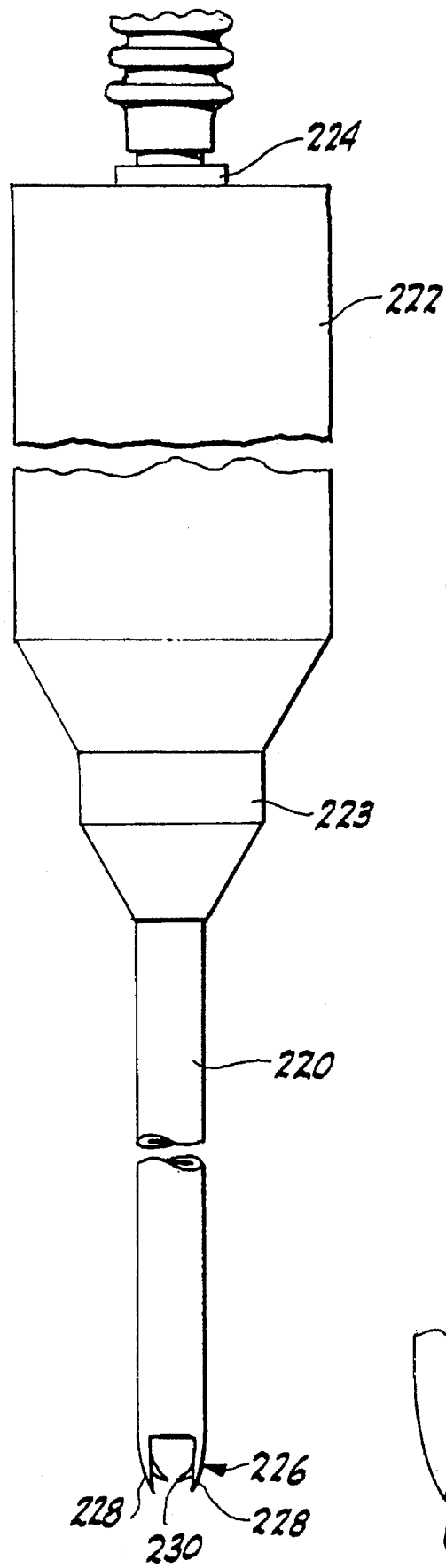
FIG. 8 is a schematic view of an alternate arrangement of a coring mechanism.
Figure 9:
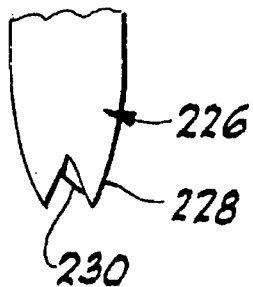
FIG. 9 is an enlarged, partial side view of the end of the coring implement of FIG. 8.

Use of a vacuum to dispose of the calyx and attached pulp can be included in a coring component operated in a processing apparatus of the type shown in FIG. 1 by minor modification of the coring implement and drive motor. Referring to FIG. 8, a hollow shaft 220 is connected to a hollow core variable-speed, drive motor 222 by a chuck 223 with internal seals (not visible) to maintain a vacuum to a hose connector 224 on the top of the motor 222. The hollow shaft 220 has an integral coring implement 226 at its distal end with reaming blades 228 and an angled or chamfered, internal boring tines 230 that are inwardly directed and angled to draw the calyx and pulp into the shaft. The tines are formed from a cut and folded-in portion of the reaming blades as shown in the enlarged view of a portion of the coring implement 226 in FIG. 9.

A flexible hose 232 is connected to a disposal container and vacuum source as schematically shown for the vacuum conduit in FIG. 6.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. Produce processing apparatus for produce items having a calyx the processing apparatus comprising:

a.) a pickup station and a release station;

b.) produce feed means for conveying produce items having a calyx to the pickup station wherein individual produce items are located for pickup at the pickup station;

c.) vacuum means having a vacuum conduit with a vacuum orifice for engaging the calyx of an individual produce item located at the pickup station;

d.) displacement means for displacing the vacuum means between the pickup station wherein the vacuum orifice is positioned proximate an individual produce item when located at the pickup station; and e.) vacuum control means for generating a vacuum in the vacuum conduit when the vacuum means is at the pickup station and breaking a generated vacuum in the vacuum conduit at the release station.

2. The produce processing apparatus of claim 1 wherein the vacuum orifice has a flat taper with an end slot.

3. The produce processing apparatus of claim 2 wherein the end slot of the vacuum orifice has protective teeth engageable with the calyx of a produce item.

4. The produce processing apparatus of claim 2 wherein the vacuum means has an outer shroud means displaceable over the vacuum orifice when displacing the vacuum means from the pickup station to the release station for orienting a produce item engaged with the orifice.

5. The produce processing apparatus of claim 1 wherein the displacement means comprises a linear actuated slide mechanism.

6. The produce processing apparatus of claim 5 wherein the slide mechanism includes cam means for raising and lowering the vacuum orifice when the vacuum means is displaced by the displacement means.

7. The produce processing apparatus of claim 1 further comprising: a coring station with a coring component wherein the coring component has:

a.) a rotatable shaft with an end having a coring implement;
   b.) displacement means for linear displacement of the rotatable shaft along the axis of the shaft;
   c.) holding means for positioning a produce item at the coring station with a calyx in an orientation engageable by the coring implement on lowering of the rotatable shaft; and
   d.) drive means for rotating the rotatable shaft.

8. The produce processing apparatus of claim 7 further comprising: conveyer means for conveying a produce item from the release station to the coring station.

9. The produce processing apparatus of claim 8 wherein the conveyer means includes a pair of endless drive chains having a series of spaced receptacles suspended between the drive chains and periodic drive means for displacing a receptacle from a stationary position at the release station to a stationary position at the coring station.

10. The produce processing apparatus of claim 9 wherein each receptacle has a cup means for retaining the position of a produce item released into the cup means by the vacuum means at the release station and cored by the coring implement at the coring station.

11. The produce processing apparatus of claim 10 wherein the cup includes a contoured wire basket having a configuration conforming generally to the type of produce item processed.

12. The produce processing apparatus of claim 7 wherein the holding means comprises the vacuum orifice of the vacuum means.

13. The produce processing apparatus of claim 7 wherein the coring implement has at least two outer, knife-like reamer blades and a central, helical corkscrew device.

14. The produce processing apparatus of claim 13 wherein the corkscrew device comprises a helical ribbon blade.

15. The produce processing apparatus of claim 7 wherein the coring implement and rotatable shaft are hollow with vacuum means for generating a vacuum in the coring implement and shaft.

16. The produce processing apparatus of claim 1 further comprising:

a coring means for coring the produce item when the produce item is engaged by its calyx in the vacuum means.

17. The produce processing apparatus of claim 15 wherein the coring means includes a coring implement.

18. The produce processing apparatus of claim 17 wherein the coring implement is hollow and includes vacuum means for generating a vacuum in the coring implement during coring and vacuum conduit means for disposal of calyx matter.

* * * * *